(12) United States Patent
Quinn

(10) Patent No.: US 6,409,154 B1
(45) Date of Patent: Jun. 25, 2002

(54) FISH TAPE FEED MECHANISM

(76) Inventor: Shawn A. Quinn, 701 W. Wright Ave., McHenry, IL (US) 60050

( * ) Notice: Subject to any disclaimer, the term of this patent is extended or adjusted under 35 U.S.C. 154(b) by 0 days.

(21) Appl. No.: 09/731,363

(22) Filed: Dec. 6, 2000

(51) Int. Cl.[7] .............................................. B65H 57/28
(52) U.S. Cl. ............................................. 254/134.3 FT
(58) Field of Search ................................ 254/134.3 FT, 254/134.3 R; 242/390.2, 390.8

(56) References Cited

U.S. PATENT DOCUMENTS

| | | | | |
|---|---|---|---|---|
| 3,610,582 A | * | 10/1971 | Passoni | 254/134.3 FT |
| 4,092,780 A | * | 6/1978 | Trethewey et al. | 254/134.3 FT |
| 4,413,808 A | * | 11/1983 | Finkle | 254/134.3 FT |
| 6,016,609 A | * | 1/2000 | Donovan et al. | 254/134.3 FT |
| 6,254,026 B1 | * | 7/2001 | Tsai | 254/134.3 FT |

* cited by examiner

Primary Examiner—Robert C. Watson
(74) Attorney, Agent, or Firm—Joseph N. Breaux

(57) ABSTRACT

A fish tape feed mechanism that is electrically powered and which feeds a fish tape into as well out of a section of electrical conduit. The fish tape feed mechanism includes a housing, an electrically powered motor drive assembly, a fish tape drive assembly, and a drive mechanism mechanically linked between the electrically powered motor drive assembly and the non-electrically conductive drive wheel of the fish tape drive assembly.

1 Claim, 1 Drawing Sheet

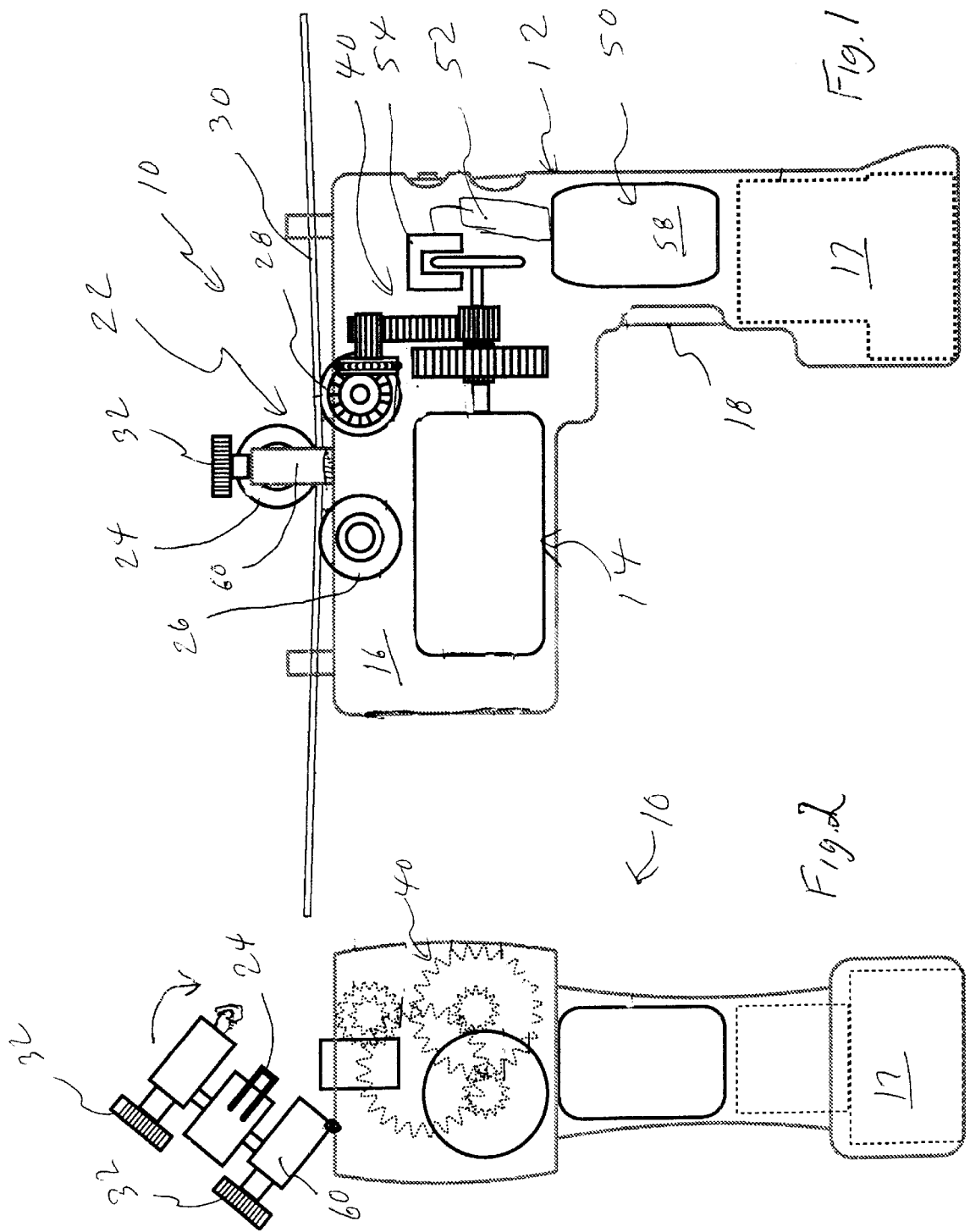

FISH TAPE FEED MECHANISM

TECHNICAL FIELD

The present invention relates to devices for pushing and pulling an electricians fish tape through sections of conduit before and during the pulling of electrical wiring through section of electrical conduit; the fish tape feed mechanism includes a housing, an electrically powered motor drive assembly positioned within the housing and controlled by a user activated switch for controlling the direction and speed of the electrically powered motor drive assembly, a fish tape drive assembly including a pair of non-electrically conductive idler wheels and a non-electrically conductive drive wheel that are configurable to frictionally grip and move a section of a fish tape by an adjustment mechanism for adjusting the gripping force between the fish tape drive assembly and a section of the fish tape, and a drive mechanism mechanically linked between the electrically powered motor drive assembly and the non-electrically conductive drive wheel of the fish tape drive assembly and having a feed tape distance display including a microprocessor circuit programmed to utilize data input from an optical encoder mechanically linked to the fish tape drive assembly such that data from the optical encoder is processed into a fish tape feed distance by the microprocessor which then generates and transmits a set of display signals to a visual display device for continuously displaying the length of feed tape fed through the fish tape drive assembly; a non-electrically conductive idler wheel of the pair of non-electrically conductive idler wheels of the fish tape drive assembly being mounted onto a pivoting bracket to allow for the lateral insertion of a section of feed tape between the one non-electrically conductive idler wheel and the non-electrically conductive drive wheel.

BACKGROUND ART

Electrical wiring in building and the like are sometimes required by building codes and the like to be run through electrical conduit or piping so as to protect the wiring from damage by rodents and the like as well as to prevent possible fire hazards caused by wires heating to dangerous temperatures due to over current conditions and the like. Although the use of conduit is a good idea, it can be difficult for electricians to pull lengths of electrical wiring through the electrical conduit requiring the electrician to feed a fish tape into one end of a section of conduit and through the empty conduit until it emerges from the opposite end of the conduit section. The end of the electrical wiring is then attached to the fish tape and the fish tape is then pulled back through the section of conduit pulling the electrical wiring along with it. Although this works well, considerable force is often required to accomplish this task which can easily tire out one or more electricians, especially when working under hot or otherwise physically demanding construction site conditions. It would be a benefit, therefore, to have a fish tape feed mechanism that was electrically powered and which could feed the fish tape in as well as withdraw the fish tape from a section of conduit.

GENERAL SUMMARY DISCUSSION OF INVENTION

It is thus an object of the invention to provide a fish tape feed mechanism that includes a housing, an electrically powered motor drive assembly positioned within the housing and controlled by a user activated switch for controlling the direction and speed of the electrically powered motor drive assembly, a fish tape drive assembly including a pair of non-electrically conductive idler wheels and a non-electrically conductive drive wheel that are configurable to frictionally grip and move a section of a fish tape by an adjustment mechanism for adjusting the gripping force between the fish tape drive assembly and a section of the fish tape, and a drive mechanism mechanically linked between the electrically powered motor drive assembly and the non-electrically conductive drive wheel of the fish tape drive assembly and having a feed tape distance display including a microprocessor circuit programmed to utilize data input from an optical encoder mechanically linked to the fish tape drive assembly such that data from the optical encoder is processed into a fish tape feed distance by the microprocessor which then generates and transmits a set of display signals to a visual display device for continuously displaying the length of feed tape fed through the fish tape drive assembly; a non-electrically conductive idler wheel of the pair of non-electrically conductive idler wheels of the fish tape drive assembly being mounted onto a pivoting bracket to allow for the lateral insertion of a section of feed tape between the one non-electrically conductive idler wheel and the non-electrically conductive drive wheel.

Accordingly, a fish tape feed mechanism is provided. The fish tape feed mechanism includes a housing, an electrically powered motor drive assembly positioned within the housing and controlled by a user activated switch for controlling the direction and speed of the electrically powered motor drive assembly, a fish tape drive assembly including a pair of non-electrically conductive idler wheels and a non-electrically conductive drive wheel that are configurable to frictionally grip and move a section of a fish tape by an adjustment mechanism for adjusting the gripping force between the fish tape drive assembly and a section of the fish tape, and a drive mechanism mechanically linked between the electrically powered motor drive assembly and the non-electrically conductive drive wheel of the fish tape drive assembly and having a feed tape distance display including a microprocessor circuit programmed to utilize data input from an optical encoder mechanically linked to the fish tape drive assembly such that data from the optical encoder is processed into a fish tape feed distance by the microprocessor which then generates and transmits a set of display signals to a visual display device for continuously displaying the length of feed tape fed through the fish tape drive assembly; a non-electrically conductive idler wheel of the pair of non-electrically conductive idler wheels of the fish tape drive assembly being mounted onto a pivoting bracket to allow for the lateral insertion of a section of feed tape between the one non-electrically conductive idler wheel and the non-electrically conductive drive wheel.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 1 is a cutaway side plan view of an exemplary embodiment of the fish tape feed mechanism of the present invention.

FIG. 2 is a cutaway end plan view of the exemplary fish tape feed mechanism of FIG. 1.

EXEMPLARY MODE FOR CARRYING OUT THE INVENTION

FIGS. 1 and 2 show various aspects of an exemplary embodiment of the fish tap feed mechanism of the present invention generally designated 10. Fish tape feed mechanism 10 includes a housing, generally designated 12; an electrically powered motor drive assembly, generally designated 14, positioned within a cavity 16 within housing 12, powered by rechargeable battery power supply 17, and controlled by a user activated switch 18 for controlling the direction and speed of electrically powered motor drive assembly 14; a fish tape drive assembly, generally designated 22, including two non-electrically conductive idler wheels 24,26 and a non-electrically conductive drive wheel 28 that are configurable to frictionally grip and move a section of a fish tape 30 by an adjustment mechanism, generally designated 32, for adjusting the gripping force between the fish tape drive assembly 22 and a section of fish tape 30 as well as adjusting fish tape drive assembly 22 for a particular width fish tape between ⅛ and ¼ inches; and a drive mechanism, generally designated 40, mechanically linked between electrically powered motor drive assembly 14 and non-electrically conductive drive wheel 28 of fish tape drive assembly 22 and having a feed tape distance display unit, generally designated 50, including a microprocessor circuit 52 programmed to utilize data input from an optical encoder 54 mechanically linked to fish tape drive assembly 22 such that data from optical encoder 54 is processed into a fish tape feed distance by microprocessor circuit 52 which then generates and transmits a set of display signals to a visual display device such as the LCD display 58 used in this embodiment for continuously displaying the length of feed tape 30 fed through fish tape drive assembly 22.

Non-electrically conductive idler wheel 24 of fish tape drive assembly 22 is mounted onto a pivoting bracket 60 to allow for the lateral insertion of a section of feed tape 30 between the one electrically non-conductive idler wheel 24 and the non-electrically conductive drive wheel 28.

It can be seen from the preceding description that a fish tape feed mechanism has been provided.

It is noted that the embodiment of the fish tape feed mechanism described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fish tape feed mechanism for feeding and retracting an electrical feed tape through sections of electrical conduit; the fish tape feed mechanism comprising:

a housing:

an electrically powered motor drive assembly positioned within said housing and controlled by a user activated switch for controlling the direction and speed of said electrically powered motor drive assembly;

a fish tape drive assembly including a pair of non-electrically conductive idler wheels and a non-electrically conductive drive wheel that are configurable to frictionally grip and move a section of a fish tape by an adjustment mechanism for adjusting a gripping traction force between said fish tape drive assembly and a section of the fish tape; and a drive mechanism mechanically linked between said electrically powered motor drive assembly and said non-electrically conductive drive wheel of said fish tape drive assembly and having a feed tape distance display including a microprocessor circuit programmed to utilize data input from an optical encoder mechanically linked to said fish tape drive assembly such that data from said optical encoder is processed into a fish tape feed distance by said microprocessor which then generates and transmits a set of display signals to a visual display device for continuously displaying the length of feed tape fed through said fish tape drive assembly;

a non-electrically conductive idler wheel of the pair of non-electrically conductive idler wheels of the fish tape drive assembly being mounted onto a pivoting bracket to allow for the lateral insertion of a section of feed tape between the one non-electrically conductive idler wheel and the non-electrically conductive drive wheel;

said pivoting bracket being pivotable into an open position to allow for lateral insertion of a section of the feed tape between said one of said pair of non-electrically conductive idler wheels and said non-electrically conductive drive wheel and pivoted and lockable into a closed operational position for use.

\* \* \* \* \*